May 2, 1950  E. ALBAUGH, SR  2,506,287
DEVICE FOR PICKING COTTON

Filed July 21, 1945  2 Sheets-Sheet 1

INVENTOR.
Ellis Albaugh, Sr.
BY Caesar and Rivise
ATTORNEYS

May 2, 1950        E. ALBAUGH, SR        2,506,287
DEVICE FOR PICKING COTTON

Filed July 21, 1945        2 Sheets—Sheet 2

INVENTOR.
Ellis Albaugh, Sr.
BY Caesar and Rivise
ATTORNEYS

Patented May 2, 1950

2,506,287

UNITED STATES PATENT OFFICE 2,506,287

DEVICE FOR PICKING COTTON

Ellis Albaugh, Sr., San Antonio, Tex.

Application July 21, 1945, Serial No. 606,319

8 Claims. (Cl. 56—49)

The present invention has reference to devices for picking cotton.

Though the cultivation of cotton was begun in this country over three hundred years ago, and mechanical devices for harvesting cotton were first patented almost a century ago, by far the major portion of the cotton crop is still being harvested by hand. The reasons are set forth in Bulletin No. 452 of the Texas Agricultural Experiment Station, which contains the results of a study made of the various types of commercial cotton harvesters. The prior art pickers are very inefficient and wasteful, and collect a high percentage of trash with the picked cotton. Furthermore, the lint from the mechanically picked cotton is invariably of a lower grade than in the case of hand picked cotton, and the staple is in many cases shorter.

The primary object of this invention is to provide a device for mechanically picking cotton, which is capable of picking cotton with a high degree of efficiency and with minimum waste, which automatically rejects trash and other foreign material, and which produces a lint of a grade and staple substantially equal to that of hand picked cotton.

Another object is to provide a mechanical cotton picker, which is of relatively simple and rugged construction, which requires a minimum amount of care and attention, and which is very inexpensive in operation.

Another object is to provide a mechanical picker for cotton having picker elements, which can be easily and readily replaced by a relatively inexperienced person in the cotton field.

The cotton harvester of the invention consists essentially of a frame adapted to be drawn or propelled over a cotton field, a plurality of endless picker chains suspended from said frame, said chains being of a length just insufficient to permit their contacting the ground, and being of flexible construction and being free to swing backwards and forwards, and means to move each of said chains vertically in reference to said frame.

In the preferred embodiment of the invention, the picker chains are suspended from rotatable drums mounted in the frame. Two or more sets of drums and chains may advantageously be provided, and the chains on adjacent drums are preferably arranged in staggered relation. Means are preferably provided to restrict the side swing of the chains, and means may advantageously be provided to restrict the forward folding and bending of the chains.

The picking elements are preferably in the form of radially extending longitudinal fins, whose outer free edges are on the surface of a truncated cone, and are provided with a plurality of teeth inclined toward the narrower base of the truncated cone and fashioned at their outer ends with pointed hooks, the alternate teeth being bent in opposite directions from the plane of the fins.

Referring briefly to the drawings.

Figure 1:
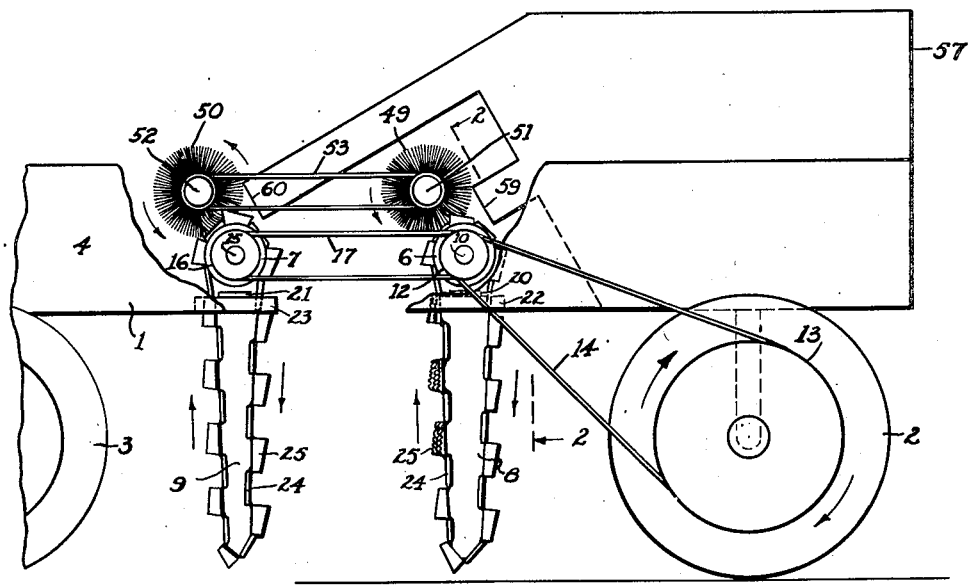
Figure 1 is a fragmentary, diagrammatic representation in side elevation, partly broken away, of a cotton picking apparatus embodying my inventive concept.

Referring to Figure 1 in greater detail, the frame, which constitutes the support for the operating elements of the cotton picker and which is illustrated rather diagrammatically, is indicated generally by the numeral 1. The frame may be mounted on a set of front wheels and a set of rear wheels, one of the front wheels being shown and indicated by 2, and one of the rear wheels being shown and indicated by 3. The means for drawing or propelling the frame over the cotton to be harvested does not constitute part of the invention, and hence has not been illustrated.

The frame is shown as having the side walls 4 and 5, between which are rotatably mounted one or more drums for carrying the picker chains. Two drums 6 and 7 are shown, as this number has been found to be suitable for practical purposes. The surfaces of the drums are preferably smooth so that if one of the picker chains is accidentally caught in a plant or otherwise, the chain will slide on the drum until released and will not interfere with the functioning of any other part of the machine. The frame may be provided with a floor, except in the vicinity of the two drums, so as to permit the chains to be suspended from the drums.

Passing about and suspended from the forward drum 6 are a plurality of endless picker chains indicated by 8, 8a, 8b, 8c, etc. These chains are relatively narrow as compared with their length, and are preferably arranged so that the space between two adjacent chains is about the width of one of the chains. Passing about and suspended from the rear drum 7 are a plurality of picker chains indicated by 9, 9a, 9b, 9c, etc. All of the picker chains are of substantially the same form of construction, and the chains on the drum 7 are disposed so as to be right beyond the spaces between the chains on the drum 6. The staggered arrangement of the chains on the two drums renders certain that all the plants traversed by the device are within the zone of action of one of the picking chains. A third drum (not shown) with additional picker chains may be provided to improve the coverage. In such case, the chains may be spaced more widely to minimize the possibility of entanglement.

Any suitable means may be provided to rotate the drums 6 and 7 and thereby to move the picker chains. For convenience of illustration, the drum 6 is shown as being driven from the front wheel 2, and the drum 7 is shown as being driven in turn from the drum 6. The drum 6 is shown as being provided with a shaft 10 extending through the near side wall 4, on which shaft are fixed the two pulleys 11 and 12. The axle of the wheel 2 is provided with the pulley 13. The pulleys 11 and 13 are connected by the endless belt 14, which transmits the rotation of the wheel 2 to the drum 6. The rear drum 7 is also provided with a shaft 15, on the near end of which is mounted a pulley 16. The two pulleys 12 and 16 are connected by means of the endless belt 17, which transmits the rotation of the drum 6 to the drum 7.

The picker chains are flexible and of insufficient length to reach the ground. As the apparatus moves over the ground, the endless chains travel with the drums on which they are mounted, and tend to swing forward and backward. There is also a tendency to swing sidewards. In the presently preferred embodiment of the invention, means are provided to restrict the side swing of the picker chains, each chain being maintained in its own longitudinal zone.

The means for restricting the side swing of the picker chains may advantageously consist of a number of inverted U-shaped guides positioned between the adjacent picker chains just below the drums. The U-shaped guides for the front set of picker chains are denoted by 18, and the guides for the rear set of chains are denoted by 19. The guides 18 are carried by a rod or bar 20, which extends between the side walls 4 and 5 below the drum 6, and the guides 19 are carried by a similar rod or bar 21, which extends between the side walls below the drum 7. Suitable means, such as brackets 22, 23, may be provided to support the ends of the rods or bars 20 and 21. The guides are somewhat greater in length than the diameter of the drums 6, 7, and the side arms of the guides are adapted to come into contact with the picker chains just below the drums. They, thereby, limit the side swing of the picker chains, not only preventing entanglement of adjacent chains but also considerably increasing the efficiency of each picker chain.

Each picker chain is of substantially the same construction, the details being shown on a full-sized scale in Figures 3 to 6 inclusive. As shown in said figures of the drawing, the chains consist of plain links 24 and picker links 25. The plain links are shown as alternating with the picker links, as this is the presently preferred arrangement. However, I am not precluded from arranging them in other ways.

Figure 4A:
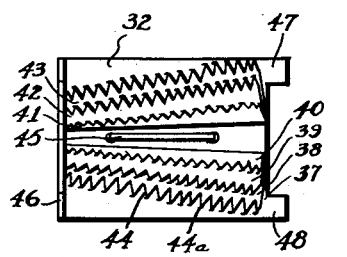
Figure 4a is a plan view of the picking element of the picking link.
Figure 4:
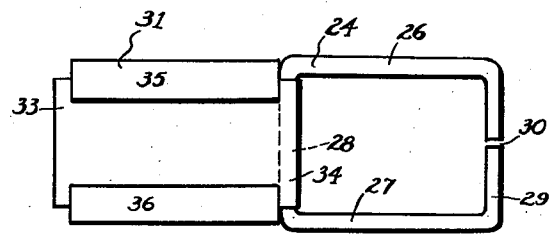
Figure 4 is a plan view of two adjacent links, the picking element of the picker link being removed.
Figure 5:
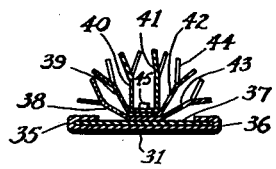
Figure 5 is a cross-sectional view taken on line 5—5 of Figure 3.
Figure 6:
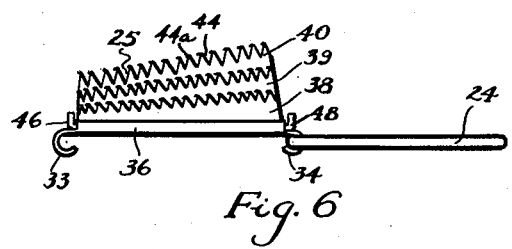
Figure 6 is a side view of two adjacent links of one of the picker chains.

The plain links 24 are formed of relatively heavy wire bent to substantially rectangular form. Referring to Figure 4, the link 24 is shown as having the two sides 26, 27 and the two ends 28, 29. The end 29 has the split 30.

The picker link 25 consists essentially of the base plate 31 and a picking element 32. The base plate 31 has the two bent ends 33 and 34. The bent end 33 receives the end 29 of one plain link 24, and the bent end 34 receives the end 28 of the next plain link. It will be understood that an entire endless chain is made up of a relatively large number of plain links 24 and picker links 25 connected as shown in Figure 4. The base plate 31 also has the two bent-over side arms 35 and 36, and is thereby adapted to slidably receive the picking element 32.

Figure 7:
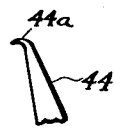
Figure 7 is a plan view of one of the picking teeth before it is bent out of the plane of the fin.

The picking element 32 consists essentially of a flat plate 37, from which project the longitudinally extending toothed fins 38, 39, 40, 41, 42 and 43. These fins extend substantially radially from about the longitudinal central line of the plate 37. Each fin increases in height from the front to the rear of the plate. The fins increase successively and progressively in height from the outer fins to the central fins. The teeth, which are indicated by 44, may advantageously be formed by cutting relatively long V-notches in the outer edge of each of the fins, and bending the alternate teeth in opposite directions. The teeth are preferably inclined toward the forward end of the picking element, and are fashioned at their outer ends in hooks 44a. One of the teeth is shown on an enlarged scale in Figure 7.

A very convenient way of constructing the fins is to provide three trapezoidal flat blanks of substantially the same dimensions, form the teeth in their outer edges, superpose the three blanks on the flat plate 37, secure them to each other and to the plate by means of a staple 45, bend the top blank to form a U, then bend the other two blanks so as to extend in substantially the same direction as the arms of the U, and finally bend the alternate teeth in each fin in opposite directions.

It is important at this point to note that the free ends of the teeth 44 are on the surface of a truncated cone, each tooth pointing toward the smaller base. It follows that the hooks of the teeth on a given fin are progressively higher from the front to the rear of the fin, and that the teeth are also progressively higher from the outer fins to the central fins.

The plate 37 carrying the tooth fins is adapted to be slidably received between the bent-over side arms 35, 36 of the base plate 31. Means may be provided to prevent unintentional displacement of the plate 37. The means may comprise a bent-up forward end 46 and two tabs 47, 48 at the rear end. After the plate 37 is in proper position between the arms 35, 36, it is merely necessary to bend the tabs 47, 48 up to prevent accidental displacement. In order to replace the picking element, the tabs are bent back to horizontal position, the picking element is removed, and another one put in its place.

It will be understood from the foregoing description that as the frame is propelled in a forward direction over a cotton field, the drums 6 and 7 rotate in a forward direction, thereby moving the endless picking chains 8, 8a, 8b, 8c, 9, 9a, 9b, 9c, etc. A vehicle speed of about 150 feet per minute (about 2 miles per hour) and a chain speed of about 200 feet per minute are recommended for practical operation. For the illustrated form of apparatus, this means that 96 picker fins will cover each linear foot of row of cotton plants. The picker links travel downward on the forward stretch of the chains with the narrow ends of the picking elements in the lead. The described connection between the links permits the chains to hang loosely and flexibly from the drums, and permits the chains to swing freely in a forward and backward direction. In the backward swing, the chains may be bent or folded on themselves, but in the forward swing the bending or folding of the chains is restricted by contact between the side arms 35, 36 of the base plate 31 and the plain link 24, so that the neighboring picking links cannot become entangled. The side swing of the chains is restricted by the U-shaped guides 18 and 19, so that adjacent chains are kept from entanglement.

When the chains encounter an obstacle such as a cotton stalk, they climb up the rear side of the plant, dropping snakelike, into and between the branches. The picker links are thereby caused to contact all parts of the plant. Any plant which is missed by one of the chains on drum 6 will very likely be contacted by one of the chains on drum 7. The construction of the picker chains is such that the picking elements ride over large as well as smooth objects such as unopened bolls, branches, stems, leaves, etc. However, when one of the picker links comes in contact with an open cotton boll, the cotton lint will be caught and embedded in the hooks 44a, which follow each other in rapid succession. When a piece of cotton has been grabbed by one of the picker elements, the subsequent brushing of the picker element against branches in its upper course tends to embed the hooks more firmly into the lint.

Figure 2:
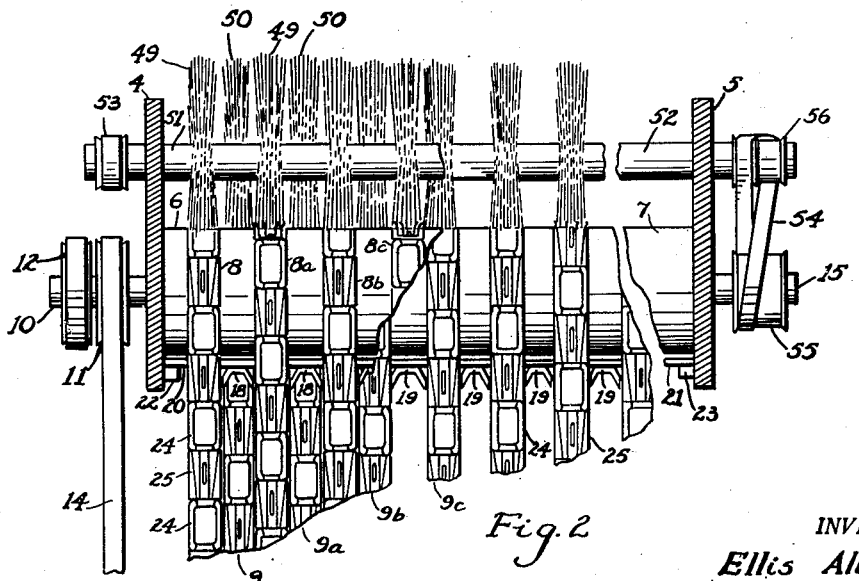
Figure 2 is a fragmentary view on a larger scale taken on line 2—2 of Figure 1.
Figure 3:
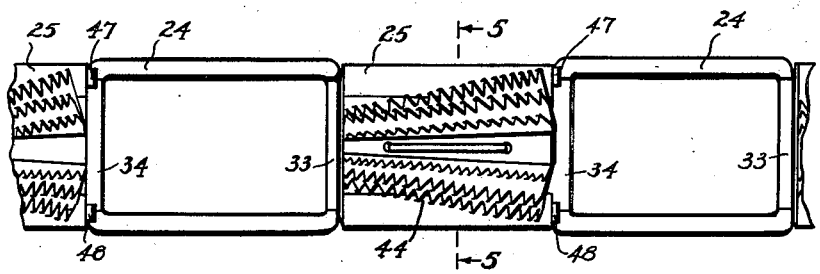
Figure 3 is a plan view of a portion of one of the picker chains.

Suitable means may be provided to remove or strip the cotton lint from the picker links. In Figures 1 and 2, I have illustrated the stripping means as being in the form of two sets of rotary brushes 49 and 50. The brushes 49 are mounted on a shaft 51, and the brushes 50 are mounted on a shaft 52. The two shafts are journaled in the walls 4 and 5 of the supporting frame 1, and are shown connected together by an endless belt 53. The shaft 52 may be driven from the shaft 15 of the drum 7 by means of a belt 54. The two shafts 15 and 52 are shown provided on their far ends with the pulleys 55 and 56 to receive the belt 54.

The brushes 49 and 50 rotate in the opposite direction to the drums 6 and 7, and hence as the picker links reach the upper part of the drums the lint is brushed or stripped off. The frame 1 may be provided with a cotton bin 57, having the two chutes 59 and 60, one in the vicinity of the nip between the drum 6 and the brush 51, and the other in the vicinity of the nip between the drum 7 and the brush 52. It is to be noted that the brushes as they strip the cotton lint from the picker links tend to straighten the teeth on the fins. However, if one of the picking elements becomes blunted or is damaged, it may be readily replaced on the field with a simple tool such as a pair of pliers.

The foregoing disclosure has been given by way of illustration only, and no limitations are to be imported into the claims unless they are required by the state of the prior art.

I claim:

1. An apparatus for picking cotton comprising a frame adapted to be propelled over a cotton field, two rotatable drums mounted transversely of said frame, one behind the other, a plurality of relatively narrow flexible picker chains passing about each of said drums, the chains on the two drums being arranged in staggered relation, and being of insufficient length to reach the ground, and means to rotate said drums as the frame is propelled over said cotton field, said chains being free to swing backward and forward as they are caused to move vertically in relation to the frame by the rotation of the drums.

2. An apparatus for picking cotton comprising a frame adapted to be propelled over a cotton field, a plurality of endless picker chains suspended from said frame, said chains being of a length just insufficient to permit their contacting the ground, and being of flexible construction and being free to swing backward and forward, means to restrict the sideward movement of said chains, and means to move each of said chains vertically in reference to said frame, each of said picking elements comprising a plate provided with a plurality of fins extending substantially radially from about the longitudinally central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks.

3. An apparatus for picking cotton comprising a frame adapted to be propelled over a cotton field, a rotatable drum mounted transversely of said frame, a plurality of endless picker chains passing about said drum in transversely spaced relation and being suspended therefrom, said chains being of insufficient length to reach the ground, and being adapted to be moved by the rotation of said drum, means to rotate said drum as said frame is propelled over said cotton field, thereby causing said chains to move about said drum, said chains being of flexible construction and being free to swing backward and forward, and means disposed in the vicinity of the drum to restrain the sidewise swing of said chains, said chains being of relatively narrow width and being composed of both plain links and links provided with picking elements, each of said picking elements comprising a plate provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks.

4. An apparatus for picking cotton comprising a frame adapted to be propelled over a cotton field, a rotatable drum mounted transversely of said frame, a plurality of endless picker chains passing about said drum in transversely spaced relation and being suspended therefrom, said chains being of insufficient length to reach the ground, and being adapted to be moved by the rotation of said drum, means to rotate said drum as said frame is propelled over said cotton field, thereby causing said chains to move about said drum, said chains being of flexible construction and being free to swing backward and forward, and means disposed in the vicinity of the drum to restrain the sidewise swing of said chains, said chains being of relatively narrow width and being composed of both plain links and links provided with picking elements, each of said picking elements comprising a plate provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks, the alternate teeth being bent in opposite directions from the plane of the fins.

5. A picking element for a cotton picking device comprising a plate provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks.

6. A picking element for a cotton picking device comprising a plate provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks, the alternate teeth being bent in opposite directions from the plane of the fins.

7. A link for a picker chain of a cotton picking device, said link comprising a base plate having its marginal edges bent to form a slideway, a second plate slidably received within said slideway, and means for securing said second plate against unintentional displacement, said second plate being provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks.

8. A link for a picker chain of a cotton picking device, said link comprising a base plate having its marginal edges bent to form a slideway, a second plate slidably received within said slideway, and means for securing said second plate against unintentional displacement, said second plate being provided with a plurality of fins extending substantially radially from about the longitudinal central line thereof, each fin increasing in height from the front to the rear of said plate and said fins increasing successively and progressively in height from the outer fins to the central fins, the outer free ends of said fins being provided with a plurality of teeth inclined to the front of said plate and fashioned at the outer ends with pointed hooks, the alternate teeth being bent in opposite directions from the plane of the fins.

ELLIS ALBAUGH, Sr.

REFERENCES CITED

The following references are of record in the file of this patent:

UNITED STATES PATENTS

| Number | Name | Date |
| --- | --- | --- |
| 24,609 | Bishop | July 5, 1859 |
| 36,736 | Sweet | Oct. 21, 1862 |
| Re. 2,138 | Howe | Dec. 2, 1865 |
| 414,924 | Snowdon | Nov. 12, 1889 |